United States Patent [19]

Denefe

[11] 4,232,424
[45] Nov. 11, 1980

[54] TWO RAIL OVERHEAD CONVEYOR DEVICE

[76] Inventor: John C. Denefe, 10832 Stone Canyond Rd., Apt. 2402, Dallas, Tex. 75230

[21] Appl. No.: 30,222

[22] Filed: Apr. 16, 1979

Related U.S. Application Data

[62] Division of Ser. No. 869,006, Jan. 12, 1978.

[51] Int. Cl.³ .............................................. A22B 5/00
[52] U.S. Cl. ......................................... 17/24; 104/97; 104/127
[58] Field of Search ....................... 17/24; 104/97, 127

[56] References Cited

U.S. PATENT DOCUMENTS

| | | | |
|---|---|---|---|
| 2,407,620 | 9/1946 | Vinsant | 104/97 |
| 2,883,700 | 4/1959 | Liebmann, Jr. | 17/24 |
| 3,078,811 | 2/1963 | Köttner | 17/24 X |

*Primary Examiner*—Willie G. Abercrombie
*Attorney, Agent, or Firm*—Zarley, McKee, Thomte, Voorhees & Sease

[57] ABSTRACT

A two rail overhead conveyor device for meat processing is disclosed comprising an eviscerating platform conveyor, an entrance or feed rail, a lower rail for smaller carcasses and an upper rail for larger carcasses running parallel to each other above the eviscerating platform, a sensor to detect carcass size, a first rail switch connected to the sensor to direct the carcasses to either the upper or lower rail, an incline conveyor to raise the larger carcasses to the upper rail level, an indexing switch to regulate the flow of carcasses to the eviscerating area, a conveyor chain to propel the carcasses along the rails, and a second rail switch and detector to coordinate the transfer of eviscerated carcasses from the upper and lower rails to the exit rail. The conveyor chain comprises combination chain links having a drop finger and a spring loaded side finger with the side finger engaging and propelling the carcass trolley frames riding on the upper rail while the drop fingers engage and propel the trolley frames riding on the lower rails.

An alternate embodiment utilizes a gravity rail drive rather than a conveyor chain to propel the carcasses to and from the eviscerating area with a conveyor chain functioning only to synchronize the movement of the carcasses over the eviscerating area with the eviscerating platform conveyor.

11 Claims, 22 Drawing Figures

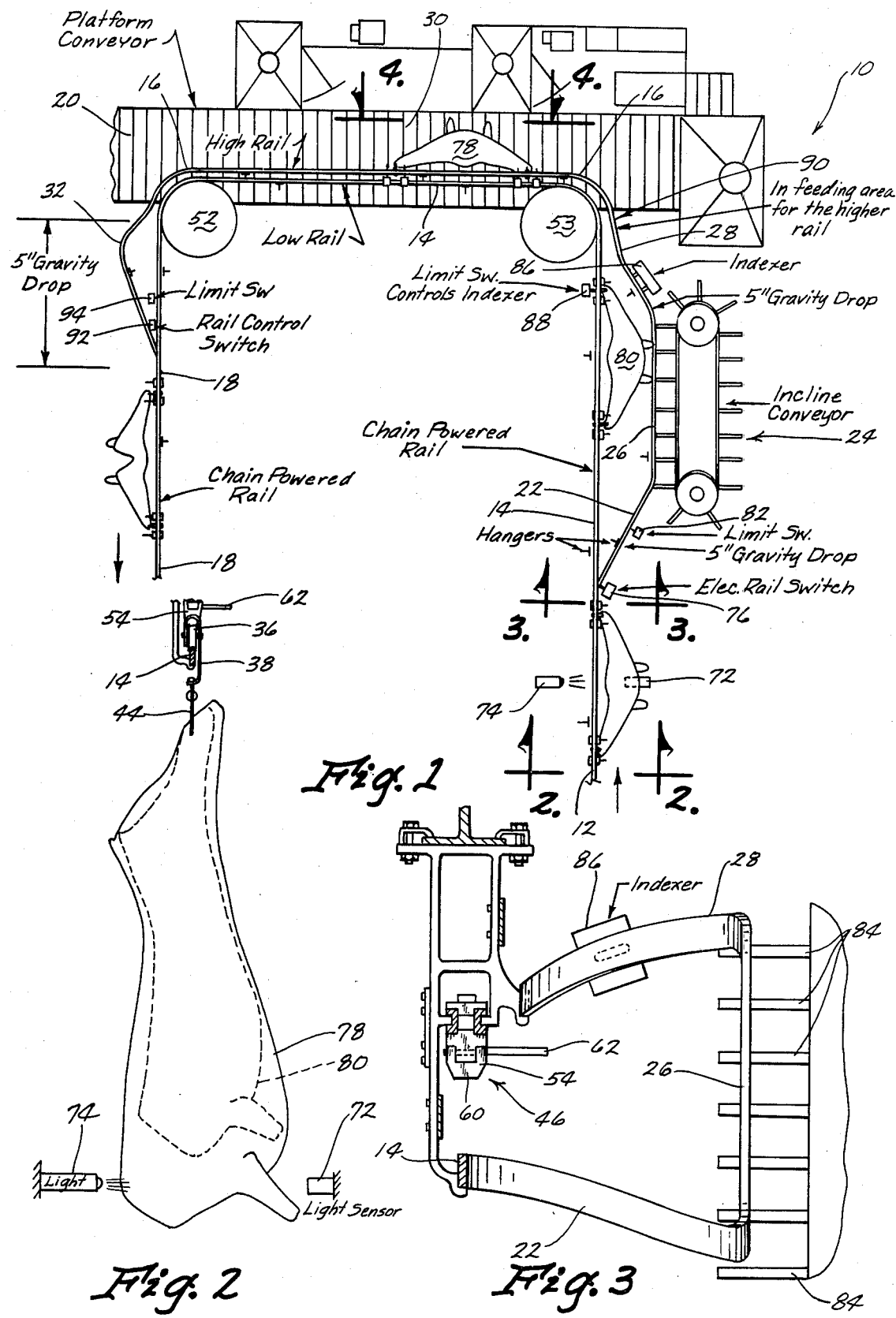

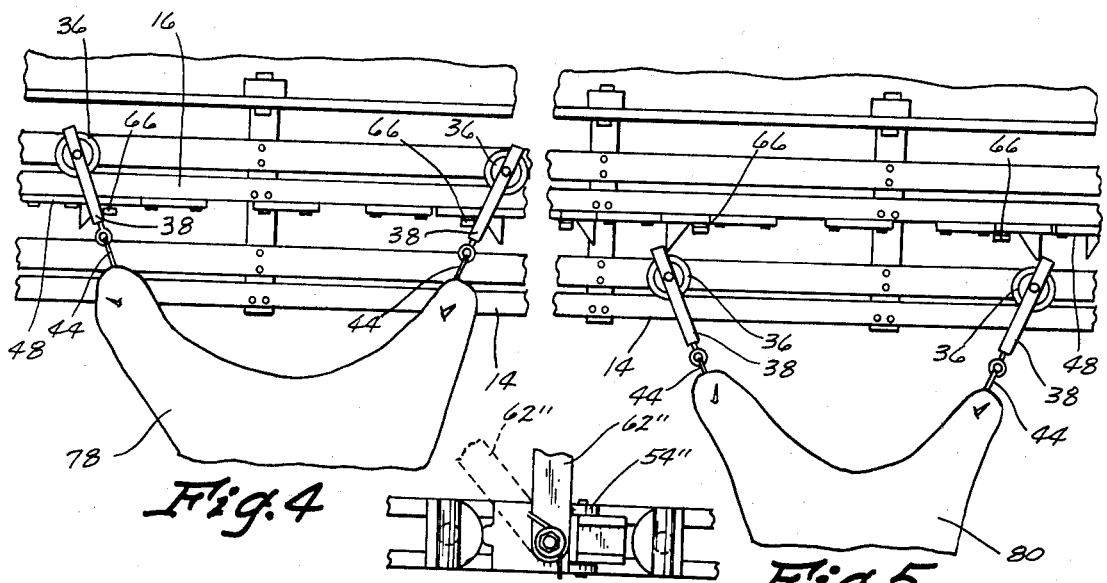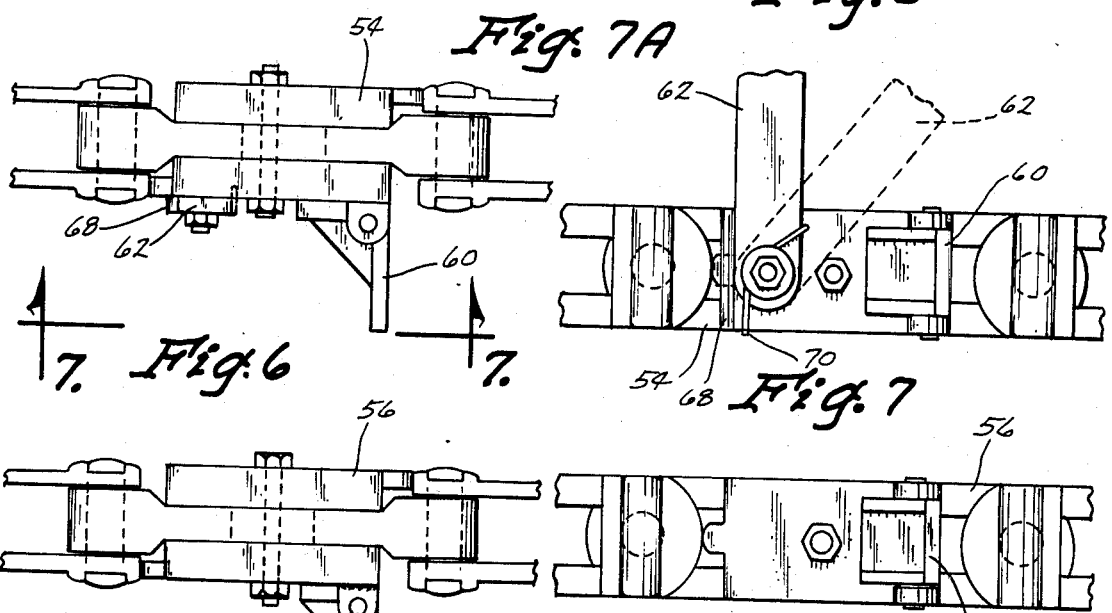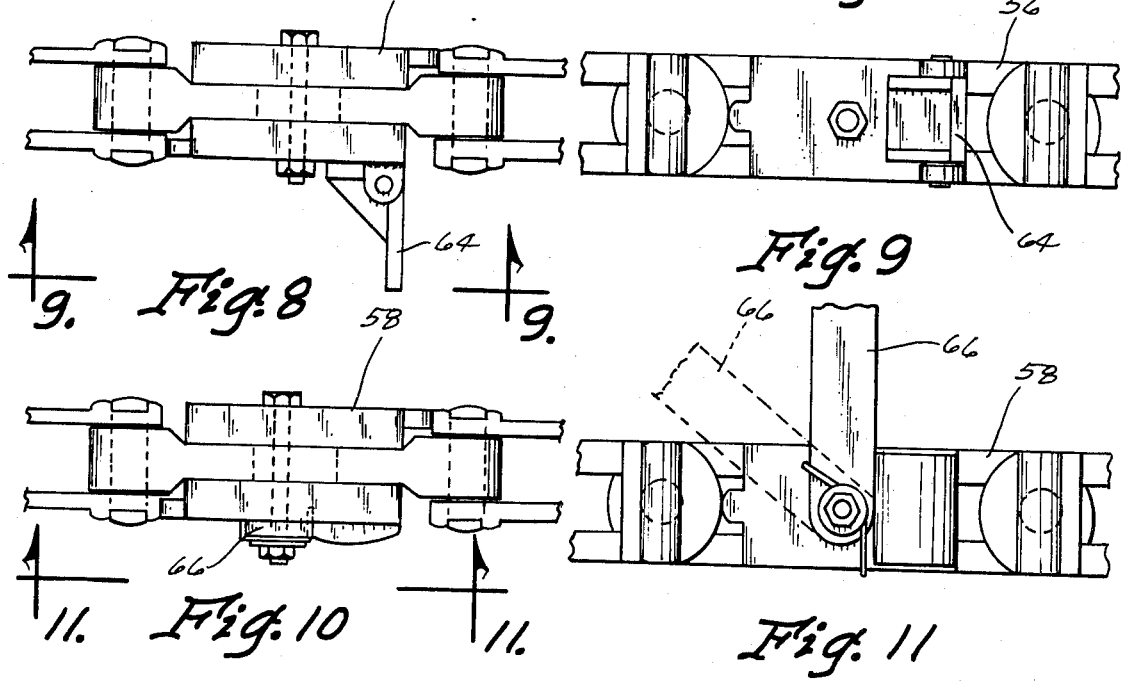

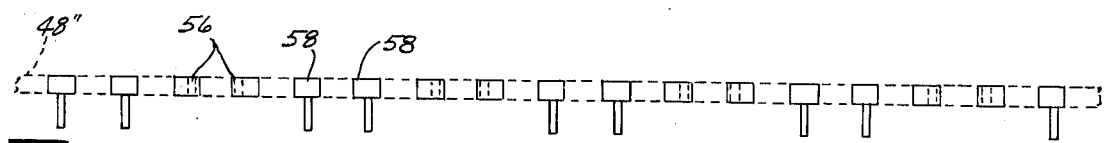
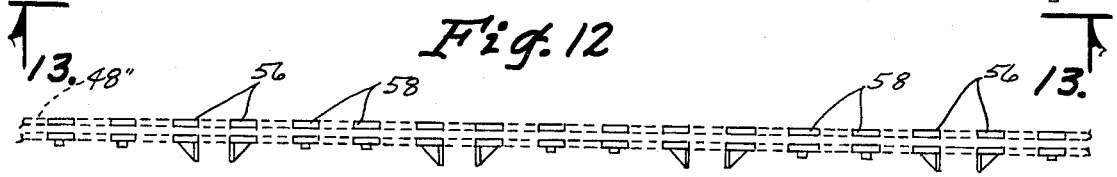
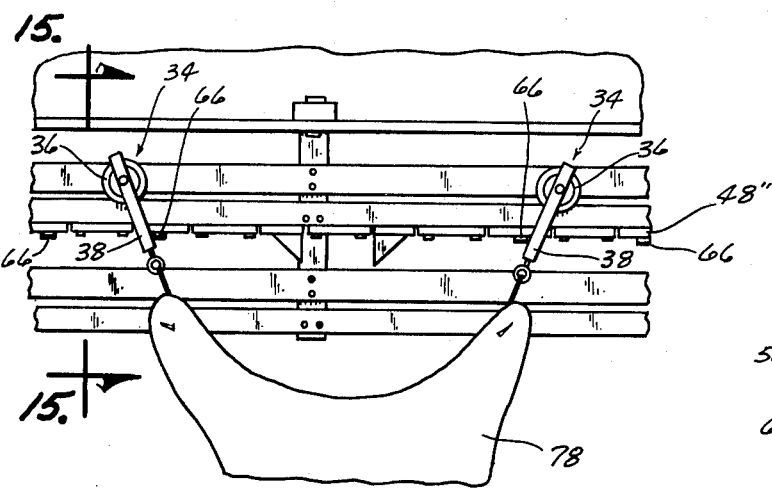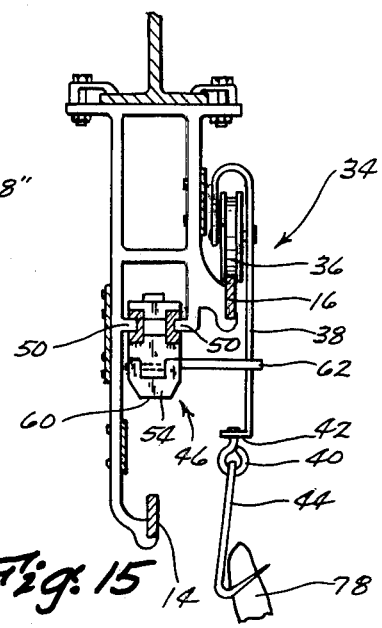
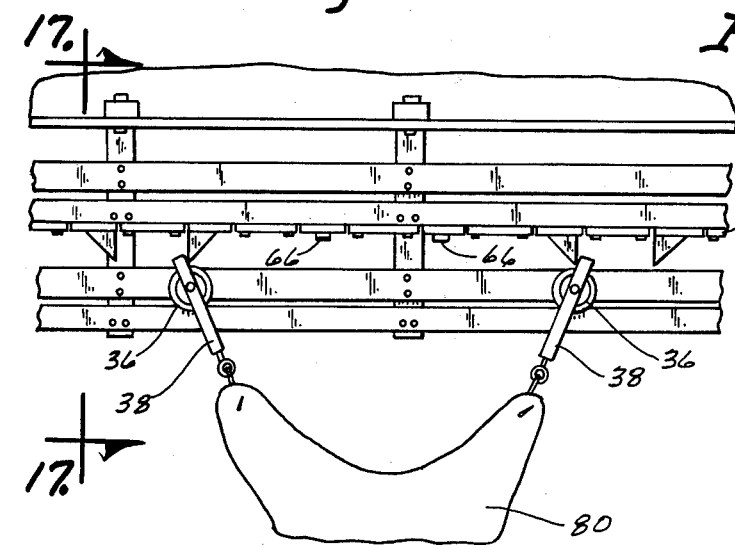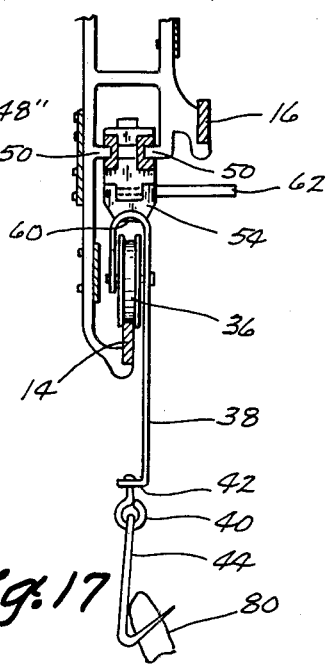

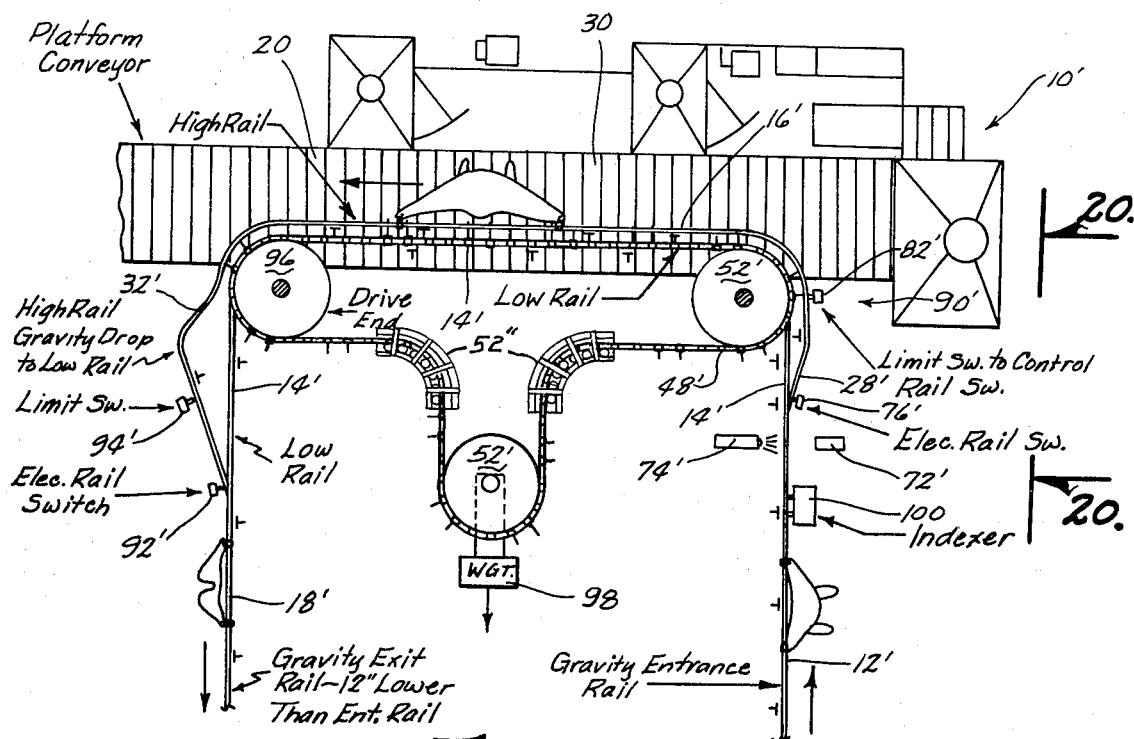
Fig. 19
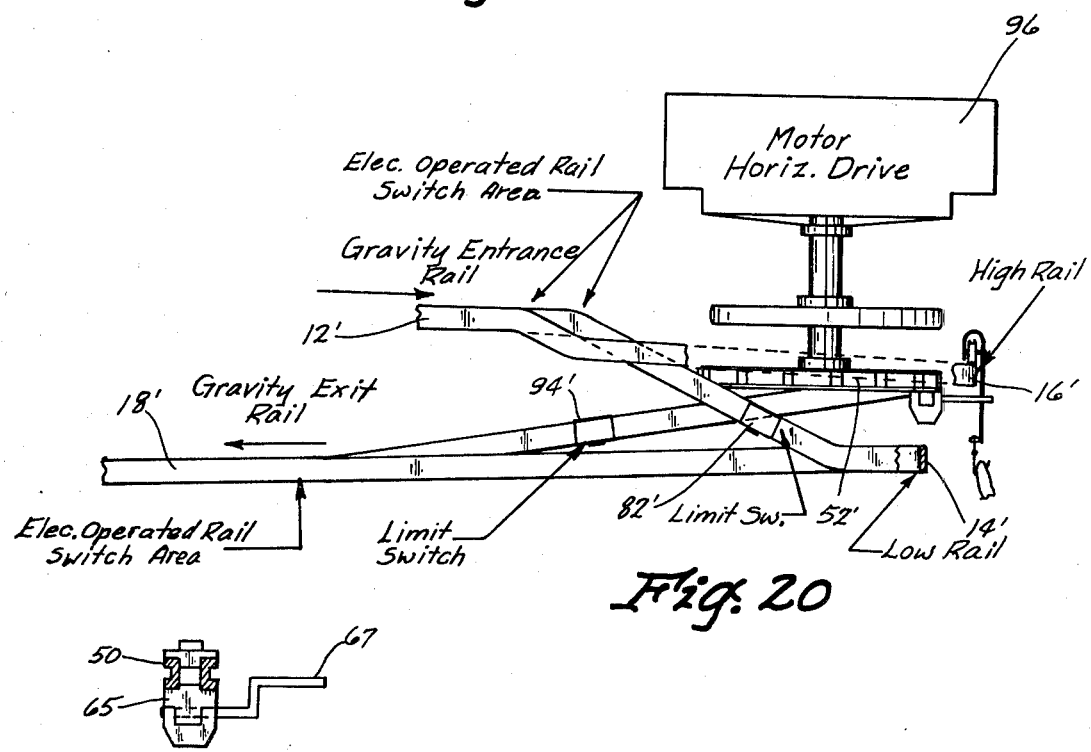
Fig. 20
Fig. 21

TWO RAIL OVERHEAD CONVEYOR DEVICE

This is a division of application Ser. No. 869,006 filed Jan. 12, 1978.

BACKGROUND OF THE INVENTION

This invention relates to a conveyor and more particularly to a two rail overhead conveyor device for meat processing. In meat processing plants, the animal will be conveyed while hanging from a conveyor over an eviscerating conveyor upon which a person riding moves at the same speed as the animal on the overhead conveyor. As the animal moves along with the eviscerating conveyor, the workmen will remove the internal organs of the animal. Prior conveyors have only one rail and one power chain for moving the animals over the eviscerator conveyor. If the animals are of different sizes, difficulty is encountered by the workmen in reaching the particular areas of the animals, and different viscera tables may have to be established with separate rails and conveyor chains to accommodate the different sizes. This is both unduly time consuming and inefficient.

SUMMARY OF THE INVENTION

A two rail overhead conveyor device for meat processing is disclosed comprising an eviscerating platform conveyor an entrance or feed rail, a lower rail for smaller carcasses and an upper rail for larger carcasses running parallel to each other above the eviscerating platform, a sensor to detect carcass size, a first rail switch connected to the sensor to direct the carcasses to either the upper or lower rail, an incline conveyor to raise the larger carcasses to the upper rail level, an indexing switch to regulate the flow of carcasses to the eviscerating area, a conveyor chain to propel the carcasses along the rails, and a second rail switch and detector to coordinate the transfer of eviscerated carcasses from the upper and lower rails to the exit rail. The conveyor chain comprises combination chain links having a drop finger and a spring loaded side finger with the side finger engaging and propelling the carcass trolley frames riding on the upper rail while the drop fingers engage and propel the trolley frames riding on the lower rails.

An alternate embodiment utilizes a gravity rail drive rather than a conveyor chain to propel the carcasses to and from the eviscerating area with a conveyor chain functioning only to synchronize the movement of the carcasses over the eviscerating area with the eviscerating platform conveyor.

It is a principal object of this invention to provide an improved overhead conveyor device for meat processing.

A further object of the invention is to provide a two rail overhead conveyor device for meat processing wherein both large and small animal carcasses are transported across an eviscerating platform conveyor at a uniform height.

A still further object of the invention is to provide a two rail overhead conveyor device for meat processing that automatically delivers large carcasses to the upper transporting rail and smaller carcasses to the lower transporting rail for uniform height above an eviscerating area.

A still further object of the invention is to provide a two rail overhead conveyor device for meat processing that utilizes only one conveyor chain to transport both large and small animal carcasses at a uniform height above an eviscerating area.

A still further object of the invention is to provide a two rail overhead conveyor device for meat processing that utilizes gravity to transport carcasses to and from an eviscerating area and maintains both large and small carcasses at a uniform height above an eviscerating area.

A still further object of the invention is to provide a two rail overhead conveyor device for meat processing that utilizes a conveyor chain comprised of chain links having both a side finger and drop finger assembly.

A still further object of the invention is to provide a two rail overhead conveyor device for meat processing that utilizes a conveyor chain comprised of chain links having both a drop finger and a spring loaded side finger.

A still further object of the invention is to provide a two rail overhead conveyor device for meat processing that automatically delivers both large and small animal carcasses to an eviscerating area at a uniform height above the eviscerating area.

A still further object of the invention is to provide a two rail overhead conveyor device for meat processing that is economical to manufacture, durable in use and automatic in operation.

BRIEF DESCRIPTION OF THE DRAWINGS

This invention consists in the construction, arrangements and combination of the various parts of the device whereby the objects contemplated are attained as hereinafter more fully set forth, specifically pointed out in the claims, and illustrated in the accompanying drawings in which:

FIG. 1 is a top plan view of the device.

FIG. 2 is an enlarged front view seen on line 2—2 of FIG. 1.

FIG. 3 is an enlarged front view seen on line 3—13 of FIG. 1.

FIG. 4 is an enlarged elevation view seen on line 4—4 of FIG. 1.

FIG. 5 is a view similar to FIG. 4 with the trolley frames riding the lower track.

FIG. 6 is an enlarged side view of a combination chain link.

FIG. 7 is a bottom view seen on line 7—7 of FIG. 6.

FIG. 7A is a view similar to FIG. 7 showing an alternate embodiment.

FIG. 8 is an enlarged side view of a chain link having a drop finger.

FIG. 9 is a bottom view seen on line 9—9 of FIG. 8.

FIG. 10 is an enlarged side view of a chain link having a side finger.

FIG. 11 is a bottom view seen on line 11—11 of FIG. 10.

FIG. 12 is a top schematic view of a conveyor chain.

FIG. 13 is a side view seen on line 13—13 of FIG. 12.

FIG. 14 is a front elevation view of a carcass being propelled by the chain of FIG. 12.

FIG. 15 is an enlarged sectional view seen on line 15—15 of FIG. 14.

FIG. 16 is another front elevation view of a carcass being propelled by the chains of FIG. 12.

FIG. 17 is an enlarged sectional view seen on line 17—17 of FIG. 16.

FIG. 19 is a top plan view of an alternate embodiment of FIG. 1.

FIG. 20 is an enlarged side view seen on line 20—20 of FIG. 19.

FIG. 21 is an alternate embodiment of a combination link.

DESCRIPTION OF THE PREFERRED EMBODIMENT

Figure 18:
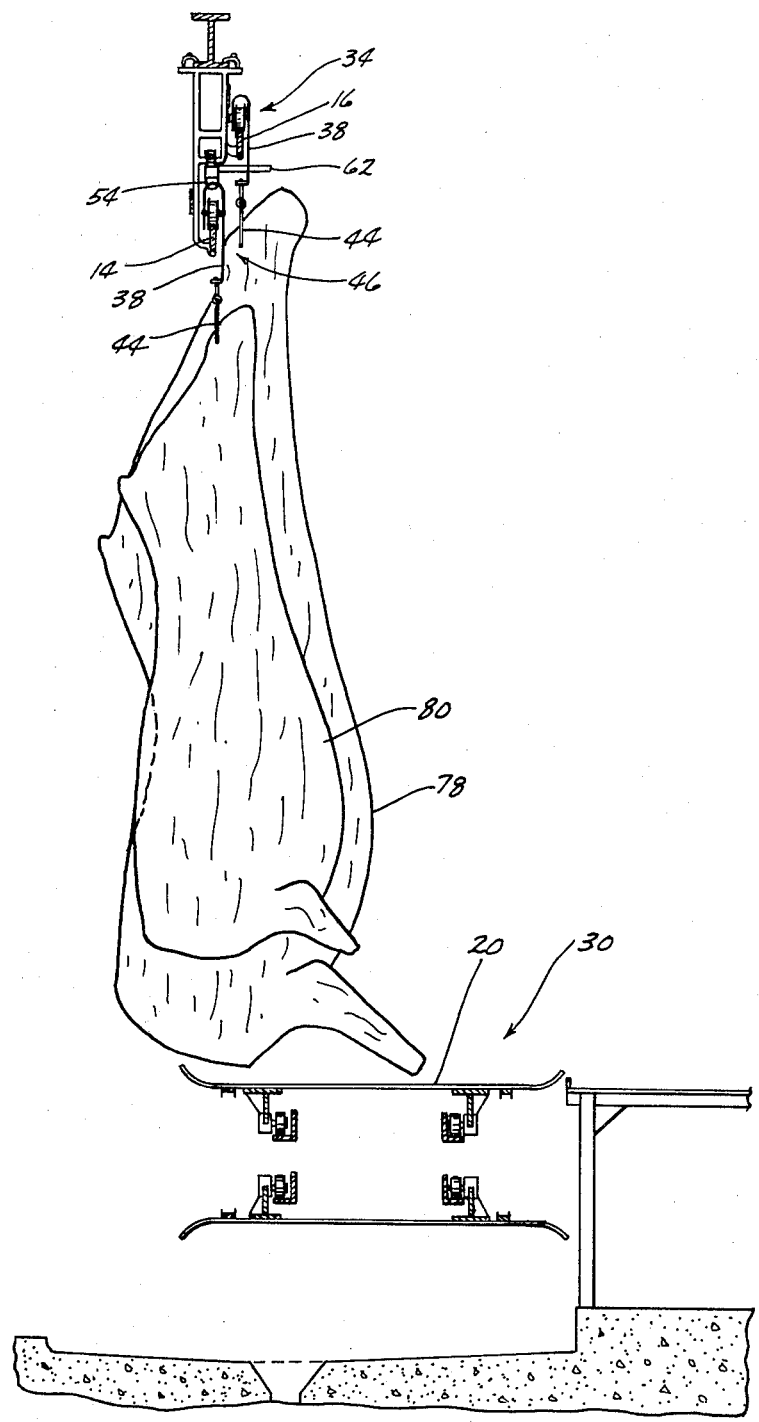
FIG. 18 is an enlarged sectional view of two carcasses passing over the eviscerating area.

The numeral 10 generally refers to the two rail overhead conveyor device shown in FIG. 1.

Conveyor device 10 is comprised of entrance rail section 12, lower rail 14, upper rail 16, and exit rail section 18. Lower rail 14 and upper rail 16 are substantially parallel as they pass above eviscerating platform conveyor 20 with rail 14 being below rail 16. Entrance rail section 12, lower rail 14 and exit rail section 18 are all at approximately the same level. Conveyor delivery rail section 22 connects entrance rail section 12 to inclined conveyor 24 and exhibits a gravity drop therebetween. Incline rail section 26 is connected at one end to rail section 22 and runs along incline conveyor 24 for connection to upper feed rail section 28 as shown in FIG. 1. Upper rail 16 is connected at one end to rail section 28, transverses the eviscerating area 30 above platform conveyor 20 and is connected to exit delivery rail section 32. Rail section 32 exhibits a gravity drop from upper rail 16 to its operational attachment to exit rail section 18. Lower rail 14 on the other hand is in direct linear alignment with and attached to entrance rail section 12 at one end and exit rail section 18 at the other end as shown in FIG. 1.

Trolley frame 34 (FIGS. 15 and 17) is adapted to carry an animal carcass and ride on the above mentioned rails. Trolley frame 34 comprises trolley wheel 36 rotatably mounted to downwardly extending support member 38. Eyelet 40 is securely attached to the lower portion 42 of support member 38 and flexibly supports a meat hook 14. The aforementioned rails matingly receive trolley wheel 36 such that trolley frame 34 may be propelled along any of the aforementioned rail sections.

Trolley frames 34 are propelled along the rails by an endless conveyor chain assembly 46 comprising a conveyor chain 48, chain guide 50 (FIG. 17), chain sprockets 52 and means (not shown) to move conveyor chain 48 along chain guide 50 at a constant linear speed. Chain guide 50 is located directly above entrance rail 12, lower rail 14, and exit rail section 18 in a single continuous run.

Conveyor chain 48 is comprised of a plurality of interconnecting links of either combination links 54 (FIG. 6), and/or drop finger links 56 (FIG. 8), and/or side finger links 58 (FIG. 10). Combination link 54 has a downwardly extending drop finger 60 and a transversely extending spring loaded side finger 62 while link 56 has a downwardly extending drop finger 64 and link 58 has a transversely extending spring loaded side finger 66. Side finger 62 is yieldably maintained against stop 68 by biasing spring 70 and is pivotable away from stop 68 by a force overcoming biasing spring 70 as illustrated by the phantom line in FIG. 7. Link 54" is an alternate embodiment of link 54 with side finger 62" pivoting in a direction opposite to side finger 62 as illustrated by the phantom lines in FIG. 7A. Link 65 of FIG. 21 is another alternate embodiment having an offset side finger 67.

A plurality of the above described links are interconnected end to end to form a continuous conveyor chain and may be comprised of one or all of the above described links. Conveyor chain 48 (FIGS. 4 and 5) is comprised of combination links 54 appropriately spaced while conveyor chain 48" (FIGS. 12, 13, 14 and 16) is comprised of alternating pairs of links 56 and 58. The drop fingers and/or side fingers of the links may make contact with and propel the trolley frames 34 along the rails. Rail guide 50 is directly above entrance rail section 12, lower rail 14 and exit rail section 18 such that a trolley frame riding any one of these rail sections will be in contact with a drop finger and propelled thereby along the rail section. FIG. 5 shows a trolley frame 34 being propelled by drop finger 60 of combination link 54 while FIG. 16 shows a trolley frame 34 being propelled by drop finger 64 of drop finger 56. The side fingers are utilized to propel a trolley frame 34 along upper rail section 16. Upper rail 16 is in close proximity and parallel to chain guide 50 such that the side finger will make contact with support member 38 of a trolley frame 34 riding on upper rail 16 as shown in FIG. 15. FIGS. 4 and 15 show a trolley frame 34 on upper rail 16 being propelled by side finger 62 of combination link 54 while FIG. 14 shows a trolley frame 34 in contact with and propelled by side finger 66 of link 58. The use of both drop fingers and side fingers on the same conveyor chain allows one conveyor chain to propel trolley frames along two distinct rail runs at different heights. In conveyor device 10, conveyor chain 48 provides the propulsion force for the trolley frames 34 with carcasses for entrance rail section 12, lower rail 14, upper rail 16, and exit rail section 18 while the force of gravity and inclined conveyor 24 provide the propulsion force as will be hereinafter more particularly described for conveyor delivery rail section 22, incline rail section 26, upper feed rail section 28, and exit delivery rail section 32 (FIG. 1).

Light sensor 72 and light 74 are located in linear alignment on opposite sides of entrance rail section 12 with light sensor 72 electrically connected to electric rail switch 76 for detection and differentiation of animal carcasses according to size. It is desired that the longer carcasses travel over eviscerating platform conveyor 20 on the upper rail section, and that the shorter carcasses travel over the conveyor 20 on the lower rail 14 so that the area of both the shorter and longer carcasses to be eviscerated is at substantially the same height above platform conveyor 20. The relative positioning of a short carcass 80 riding on lower rail 14 and a long carcass 78 riding on upper rail 16 to platform conveyor 20 is shown in FIG. 18. As the carcasses are transported along entrance rail section 12 toward the eviscerating area, a longer carcass 78 will break the beam of light between light 74 and light sensor 72 while a shorter carcass 80 will pass above the light beam leaving it undisturbed as illustrated in FIG. 2. Rail switch 76 is located at the junction of entrance rail section 12, lower rail 14, and conveyor delivery rail section 22 and functions to direct an incoming trolley frame 34 from rail section 12 to either lower rail 14, or conveyor delivery rail 22. Detection of a longer carcass 78 by sensor 72 activates rail switch 76 to divert longer carcass 78 onto conveyor delivery rail section 22 for ultimate delivery to upper rail 16. A shorter carcass 80 will not interrupt the beam of light from light 74 and therefore will pass light sensor 72 undetected and will continue straight through from entrance rail section 12 to lower rail 14 as rail switch 76 will not be activated. Rail switch 76 must be activated to divert trolley frames from entrance rail section 12 to conveyor delivery section 22. Once the longer carcass 78 is diverted by rail switch 76 to conveyor delivery rail section 22, it encounters limit switch 82 which deactivates rail switch 76. Limit switch 82 is located approximately midway on conveyor delivery rail section 22. Light sensor 72 in conjunction with rail switch 76 and limit switch 82 provides automatic detection and separation of larger carcasses 78 and smaller carcasses 80.

Conveyor delivery section 22, incline rail section 26, incline conveyor 24 and upper feed rail section 28 function to raise the larger carcasses from the lower level of entrance rail section 12 to the higher level of upper rail 6. Conveyor delivery rail section 22 branches away from conveyor chain assembly 46 such that the drop fingers no longer propel the trolley frames 34. A gravity drop is utilized to propel the carcasses along section 22 from the junction with rail section 12 to the incline conveyor area. A five inch gravity drop along rail section 22 is preferred (FIG. 3). Upon reaching the conveyor area at the termination of conveyor delivery rail section 22, trolley frame 34 is engaged by conveyor finger 84 of incline conveyor 24. Conveyor finger 84 propels the trolley frame 34 along incline rail section 26 to upper feed rail section 28. Upper feed rail section 28 also exhibits a gravity drop to propel the trolley frame 34 and carcass to upper rail 16. Indexer 86 is located on rail section 28 and is electrically connected to limit switch 88 to coordinate the flow of carcasses to the eviscerating area. Since it is desirable to maintain a preselect distance between carcasses passing over the eviscerating area, preferably six feet, indexer 86 delays the longer carcasses from entering the in feeding area 90 for upper rail 16 when a shorter carcass is entering the in feeding area for lower rail 14 as detected by limit switch 88. In other words, a shorter carcass on lower rail 14 will activate limit switch 88 to in turn activate indexer 86 to delay any introduction of longer carcasses to the eviscerating area. Since the shorter carcasses are being propelled at this point by conveyor chain assembly 46 while the longer carcasses are subject to propulsion by the gravity drop of section 28, it is advantageous to delay the entrance of the longer carcasses rather than the shorter ones.

The linear velocity of conveyor chain 48 is identical to the linear velocity of platfrom conveyor 20 so that a workman standing on conveyor platform 20 may eviscerate the carcass as it travels along above the conveyor platform. As previously noted, the longer carcasses 78 and shorter carcasses 80 are approximately the same height above platform conveyor 20 because of the relative height differences above the platform of lower rail 14 and upper rail 16 as shown in FIG. 12. Thus, the eviscerating workmen may operate more efficiently and conveniently having all carcasses at approximately the same relative height.

A shorter carcass is propelled by a drop finger over the eviscerating area, while the larger carcasses are propelled by a side finger. Once the longer carcasses are eviscerated and reach the termination of upper rail 16, exit delivery rail section 32 veers away from chain assembly 46 to disengage the side finger from trolley frame 34. Since the larger carcass 78 is no longer being propelled by conveyor chain 48, exit delivery rail section 32 exhibits gravity drop of preferably 5 inches to deliver the carcass from the end of upper rail 16 to exit rail section 18. The end of exit delivery rail section 32 is detachably connected to exit rail section 18 such that the trolley frame 34 carrying the larger carcass automatically runs off rail 32 onto rail 18 at the junction thereof. For a smaller carcass to be transferred from lower rail 14 to rail 18, rail 32 is automatically disengaged by rail control switch 92. As the small carcass approaches exit rail section 18, it activates limit switch 94. Limit switch 94 is electrically connected to rail control switch 92 such that the activation of limit switch 94 by the small carcass in turn activates rail control switch 92 to disconnect rail 32 and allow the smaller carcass to pass from lower rail 14 to exit rail section 18. Rail section 32 automatically reconnects to rail section 18 after the smaller carcass has exited. The carcasses are so spaced apart when passing over the eviscerating area 30 that there is no possibility that a larger carcass and a smaller carcass will approach the junction of rail 32 to 14 and 18 contemporaneously. Both the larger carcasses and the smaller carcasses are propelled along exit rail section 18 by the drop finger.

In operation, a carcass attached to trolley frame 34 is transported toward the eviscerating area on entrance rail section 12 by a drop finger 60 of conveyor chain 48 being in contact with the trolley frame. Light sensor 72 detects whether the carcass is the shorter carcass or a longer carcass. If a shorter carcass continues to be propelled by drop finger 60 and travels from entrance rail section 12 onto lower rail 14, and continues over conveyor platform 20 for evisceration. Conveyor chain 48 is moving at the same speed as platform conveyor 20 such that a workman standing on platform 20 opposite the carcass can eviscerate the carcass as the carcass continues down the rail. As the small carcass exits the eviscerating area 30, it activates limit switch 94 which in turn activates rail control switch 92 to allow the trolley frame to ride from lower rail 14 to exit rail section 18 and away from the eviscerating area.

A larger carcass proceeding along entrance rail section 12 will activate light sensor 72 thereby activating electric rail switch 76 to divert the larger carcass from rail 12 to conveyor delivery rail section 22. The gravity drop of rail 22 will deliver the larger carcass, the trolley frame of which has become disengaged from the drop finger of conveyor chain 48 because of the veering away of rail 22 from chain 48, to the inclined conveyor 24. A finger 84 of inclined conveyor 24 will then engage trolley frame 34 to propel it along incline rail section 26 thereby raising the longer carcass well above lower rail 14. At the end of incline rail section 26, incline conveyor 24 disengages from trolley frame 34 at the beginning of another gravity drop on upper feed rail section 28. This gravity drop will propel the larger carcass trolley frame along upper feed rail section 28 to the in feeding area 90 for upper rail 16. At this point, a side finger 62 of conveyor chain 48 will engage trolley frame 34 to propel it along upper rail 16 thus conveying the larger carcass across the eviscerating area 30. Since the larger carcass is being propelled by the conveyor chain as was the smaller carcass, it is also moving at the same rate across the eviscerating area 30 as the platform conveyor 20 (FIG. 18). As the larger carcass exits the eviscerating area from upper rail 16 to exit delivery rail section 32, side finger 62 disengages from trolley frame 34 as section 32 swings away from conveyor chain 48. A gravity drop on section 32 propels the larger carcass from the end of upper rail 16 to lower rail 18 as the chain is disengaged from the trolley frame. At this point, section 32 is contiguous with exit rail section 18 such that the trolley frame rolls directly onto rail 18 from rail 32 and the longer carcass exits along rail 18 propelled by a drop finger 60 from conveyor chain 40. Thus, the carcasses are automatically separated and delivered to the eviscerating area at the proper height, and automatically removed therefrom by this two rail-single conveyor chain device.

An alternate embodiment of conveyor device 10 is shown in FIG. 19, and is generally referred to by the numeral 10'. Conveyor device 10' is a gravity fed device with a conveyor chain 48' utilized only to synchronize the linear velocity of the carcasses as they pass over the eviscerating area 30 to the linear velocity of the platform conveyor 20.

Similar to conveyor device 10 conveyor device 10' comprises entrance rail section 12', lower rail 14', exit rail section 18', upper feed rail section 28', upper rail 16' and exit delivery rail section 32'. Entrance rail section 12' is at a greater height than exit rail section 18' so that the force of gravity is used to propel the carcasses along much of the above mentioned rail sections. Entrance rail section 12' is contiguous to lower rail 14' which in turn is contiguous to exit rail secton 18'. A gravity drop exists between rail section 12' and lower rail 14'.Upper feed rail section 28' is detachably connected to entrance rail section 12'. At the junction of rail 12' and lower rail 14' upper feed rail section 28' also exhibits a gravity drop to propel the carcass to the feeding area 90' for upper rail 16'. Sensor 72' and associated light 74' detect the longer carcasses and activate rail switch 76' to direct the longer carcasses from rail 12' to rail 28'. Rail switch 76' is deactivated by limit switch 82' as the larger carcass enters feeding area 90'.

Conveyor chain 48' is utilized to synchronize the speed of both the shorter and longer carcasses in their travel over the eviscerating area 30 to the speed of platform conveyor 20. Conveyor chain 48' is comprised of combination links 54 such that drop finger 60 engages the hanger 34 of the smaller carcass and side finger 62 engages the hanger of a larger carcass as they enter the end feeding area 90'. Conveyor chain 48' is arranged in an endless configuration around sprockets 52' roller turns 52", with horizontal drive motor 96 driving the chain. The proper tension in chain 48' is maintained by weight 98 attached to one of the sprockets 52' in a conventional manner.

As a smaller carcass leaves the eviscerating area, the hanger 34 disengages from drop finger 60 and the carcass continues to move by the force of gravity from lower rail 14' onto exit rail section 18' and away from the eviscerating area. The hanger 34 of a longer carcass riding on upper rail 16' disengages from side finger 62 as it leaves the eviscerating area and is propelled along exit delivery rail section 32' by a gravity drop in section 32'. A limit switch 94' located on section 32' is activated by the longer carcass to connect via rail switch 92', section 32' to exit rail section 18'. The larger carcass thus travels along rail section 32' to exit rail section 18' and away from the eviscerating area. Rail switch 92' automatically deactivates and detaches rail section 32' from 18' after the larger carcass passes.

In operation, the carcasses travel along entrance rail section 12' by gravity and the rate of admissions is controlled by indexer 100 located just before sensor 72'. A smaller carcass passes through sensor 72' undetected and continues on to lower rail 14'. The drop finger 60 of a link in conveyor chain 48' engages the trolley frame 34 of the shorter carcass and the carcass is propelled over rail 14' at a speed identical to that of platform conveyor 20. The carcass is eviscerated and the trolley frame 34 disengages from drop finger 60 as the carcass leaves the eviscerating area. The carcass continues along by force of gravity and exits via exit rail section 18'. A larger carcass entering along entrance rail section 12' is detected by sensor 72' that in turn activates rail switch 76'. Rail switch 76' connects upper feed rail section 28' to rail 12' such that the larger carcass is directed onto upper feed rail section 28' and is propelled by gravity into the end feeding area 90'. The larger carcass activates limit switch 82' to disengage rail 28' from rail 12'. The side finger 62 engages the trolley frame of the larger carcass and transports it across the eviscerating area. Upon leaving the eviscerating area, the side finger 62 is disengaged from the trolley frame 34 and the eviscerated larger carcass is propelled by a gravity drop along exit delivery rail section 32'. The larger carcass activates the limit switch 94' which in turn activates rail switch 92' to connect section 32' to exit rail section 18'. The larger carcass travels down rail 32' onto exit rail 18' and away from the eviscerating area. Rail switch 92' is then automatically deactivated to disconnect rail section 32' from rail section 18'.

Thus, it can be seen that this device accomplishes at least all of its stated objectives.

What is claimed is:

1. In combination,
   a revolving eviscerating platform conveyor apparatus adpated to support a workman, said platform adapted to revolve at a constant speed,
   and a two rail overhead conveyor device for meat processing comprising,
   a first rail means adapted to guide and support a conveyor trolley frame having a carcass attached thereto, said first rail means having a first end portion, a middle portion transversing over said platform conveyor at a first predetermined height therefrom and a second end portion,
   a second rail means adapted to guide and support a conveyor trolley frame having a carcass attached thereto, said second rail means having a first end portion, a middle portion transversing over said platform conveyor at a second predetermined height therefrom and a second end portion,
   first connection means for selectively detachably connecting said first end portion of said second rail means to said first rail means at a point before said middle portion,
   first means for propelling a conveyor trolley frame having a carcass attached thereto at said constant speed along said middle portion of said first rail means and along said middle portion of said second rail means,
   second means for propelling a conveyor trolley frame having a carcass attached thereto along said first end portion and said second end portion of said first rail means,
   third means for propelling a conveyor trolley frame having a carcass attached thereto along said first end portion and said second end portion of said second rail means, and
   a detection means operationally attached to said first end portion of said first rail means to detect a carcass of a predetermined size, attached to a conveyor trolley frame on said first end portion,
   said detection means being connected to said first connection means so that the detection of a carcass of said predetermined size activates said first connection means thereby guiding said trolley frame and carcass attached thereto onto said first end portion of said second rail means from said first end portion of said first rail means.

2. The combination of claim 1 wherein said first means for propelling said conveyor trolley frame comprises,
- a first conveyor chain guide adapted to receive a conveyor chain, said first guide being parallel to and above said middle portion of said first rail means,
- a conveyor chain having a plurality of interconnected links within said guide,
- means attached to said chain for engaging and propelling said trolley frames, and
- first power means for driving said chain at said constant speed.

3. The combination of claim 2 wherein said means for engaging and propelling said trolley frame comprises a first transversely extending side finger member attached to some of said links of said chain adapted for engagement of said trolley frames on said middle portion of said second rail means, and a first downwardly disposed drop finger member attached to the others of said links of chain adapted for engagement of said trolley frames on said middle portion of said first rail means.

4. The combination of claim 3 wherein said first side finger members are pivotally attached to said respective links and have a spring bias means attached thereto to yieldably maintain a transverse disposition to said links.

5. The combination of claim 2 wherein said means for engaging and propelling said trolley frame comprises said conveyor chain links with each said link having a combination second transversely extending side finger member and second downwardly disposed drop finger member attached thereto, said second side finger member adapted to engage and propel said trolley frames on said middle portion of said second rail means and said second drop finger member adapted to engage and propel said trolley frames on said middle portion of said first rail means.

6. The combination of claim 5 wherein said second side finger member is pivotally attached to each said link and is yieldably maintained in a transverse disposition by a spring bias means.

7. The combination of claim 2 wherein said second means for propelling said conveyor trolley frame comprises said first conveyor chain guide and said chain extending along and parallel to said first end portion and said second end portion of said first rail means.

8. The combination of claim 7 wherein said third means for propelling said conveyor trolley frame comprises said first end portion of said second rail means, having
- a first gravity drop rail portion, one end of said first gravity drop portion selectively, detachably connected to said first end portion of said first rail means,
- an incline conveyor means located at the other end of said first gravity drop portion such that the force of gravity propels a trolley frame along said first gravity drop portion to said incline conveyor means, said incline conveyor means adapted to propel said trolley frame to a height above said middle portion of said second rail means,
- a second gravity drop rail portion operationally connected at one end to said incline conveyor means and at the other end to said middle portion of said second rail means so that the force of gravity will propel a trolley frame from said incline conveyor means to said middle portion, and
- said second end portion of said second rail means having a third gravity drop rail portion, said second end portion attached at one end to said middle portion and at the other end selectively, detachably secured to said second end portion of said first rail means so that a trolley frame is propelled by gravity from said middle portion of said second rail means to said second end portion of said first rail means.

9. The combination of claim 2 wherein said second means for propelling said conveyor trolley frame comprises said first end portion of said first rail means being inclined toward said middle portion of said first rail means so that the force of gravity propels said trolley frame along said first end portion to said middle portion and said second end portion being inclined away from said middle portion so that the force of gravity propels said trolley frame along said second end portion away from said middle portion.

10. The combination of claim 9 whereby said third means for propelling said conveyor trolley frame comprises said first end portion of said second rail means being inclined toward said middle portion of said second rail means so that the force of gravity propels said conveyor trolley frame along said first end portion of said second rail means to said middle portion of said second rail means and said second end portion of said second rail means being inclined away from said middle portion so that the force of gravity propels said trolley frames from said middle portion along said second end portion of said second rail means to said second end portion of said first rail means.

11. The combination of claim 1 wherein said second end portion of said second rail means has a second connection means for selectively, detachably connecting said second end portion of said second rail means to said second end portion of said first rail means.

* * * * *